US007225223B1

(12) United States Patent
McCarthy et al.

(10) Patent No.: US 7,225,223 B1
(45) Date of Patent: May 29, 2007

(54) METHOD AND SYSTEM FOR SCALING OF RESOURCE ALLOCATION SUBJECT TO MAXIMUM LIMITS

(75) Inventors: Clifford A. McCarthy, Dallas, TX (US); Raja Daoud, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

(21) Appl. No.: 09/665,934

(22) Filed: Sep. 20, 2000

(51) Int. Cl.
*G06F 15/16* (2006.01)
(52) U.S. Cl. .................. 709/204; 709/201; 709/202
(58) Field of Classification Search ............... 709/104, 709/103, 202, 204, 201; 718/103, 104
See application file for complete search history.

(56) References Cited

U.S. PATENT DOCUMENTS 5,257,387 A * 10/1993 Richek et al. ............... 395/800
5,634,072 A * 5/1997 Allen et al. ................. 395/674

* cited by examiner

*Primary Examiner*—Jason Cardone
*Assistant Examiner*—Adnan M. Mirza

(57) ABSTRACT

A software method and computer system using said method are disclosed for efficiently reallocating unused system resources in a system in which unused system resources are initially allocated among groups that may become active or inactive. The method reallocates unused resources among active groups by scaling up these groups' initial entitlement shares, subject to maximum caps that may apply. For each group, the method calculates a scaling ratio equal to the cap divided by the entitlement, and then sorts the groups according their scaling ratios. The method processes each group in increasing order of their scaling ratios and reaches a maximal share of system resources to be allotted to each group, where the maximal share for an active group is between, or equal to, the group's initial entitlement value and its cap. Inactive groups have maximal shares equal to zero, reflecting that they receive no system resources. As the method processes the groups, it attempts to simply scale each active group by its scaling ratio. If scaling all unprocessed groups by the current group's scaling ratio would exceed the unallocated resources, then the remaining groups are scaled by the remaining resources divided by the sum of the entitlements of the remaining groups. Because the groups are sorted in order of increasing scaling ratios, the remaining active groups may be scaled as described without exceeding their caps.

17 Claims, 3 Drawing Sheets

METHOD AND SYSTEM FOR SCALING OF RESOURCE ALLOCATION SUBJECT TO MAXIMUM LIMITS

FIELD OF INVENTION

The present invention relates generally to computer software. More particularly, the invention relates to a software method for allocating computer system resources among various groups of processes.

BACKGROUND

In the field of computer systems, it is desirable to allocate system resources among various groups of processes running on the system. A computer system may have limited resources, and users of that system may want to ensure that those resources are allocated in a particular manner so they may be used most efficiently. The user may allocate system resources among groups directly, or indirectly through the system whereby the allocations are determined by other system processes. The user may also allocate maximum limits of allocations for some or all of the groups to improve efficiency.

System resources include any limited resource in the computer system, including but not limited to memory resources, central processing unit (CPU) resources, disk bandwidth, etc. Groups of processes using those resources may be software applications running on the system, portions of applications, or any other processes that use system resources.

By way of illustration, a system may run four groups or applications—A, B, C, D—and may allocate 100% of a particular system resource among those groups. FIG. 1a shows a pie chart dividing one of the system's resources according to groups' entitlements. A system resource, such as memory, is represented by the entire chart which is divided among groups. For example, the system's memory resources may be allocated as follows: Group A 10%, Group B 20%, Group C 30%, and Group D 40%, as shown in FIG. 1a. The relative amounts of system resources initially allocated to each group are referred to herein as the entitlement ($E(i)$), where i is a particular group. As used herein, $E(i)$ is expressed as a percent value of the total amount of a particular system resource.

A problem occurs when one of the groups is inactive or not enabled. By way of example, a group may become inactive if it is taken off-line, if it only operates during certain hours of the day, or if it is otherwise turned off and is not using a system resource. In the case of a software application as a group, the application may run only at certain times of the day or only in response to certain other system activities.

SUMMARY OF INVENTION

A software method is disclosed for reallocating computer system resources among active groups where the groups may have maximum caps set on the resources they may be allocated. The method applies to any system having multiple groups that share a finite amount of a system resource. The method receives two externally-configured values for each group—an entitlement value and a maximum cap value. Initially, each group may be allocated an entitlement share of the resource. Different groups may be active and inactive at different times. The method reallocates the entitlements of inactive groups among the active groups to more efficiently use the resource. Additionally, the method considers the groups' caps when reallocating unused resources to avoid exceeding these values.

For each group, the method calculates a scaling ratio equal to the cap divided by the entitlement, and then sorts the groups according their scaling ratios. The method processes each group in increasing order of their scaling ratios and reaches a maximal share of system resources to be allotted to each group, where the maximal share for an active group is between, or equal to, the group's initial entitlement value and its cap. Inactive groups have maximal shares equal to zero, reflecting that they receive no system resources. As the method processes the groups, it attempts to simply scale each active group by its scaling ratio. If scaling all unprocessed groups by the current group's scaling ratio would exceed the unallocated resources, then the remaining groups are scaled by the remaining resources divided by the sum of the entitlements of the remaining groups. Because the groups are sorted in order of increasing scaling ratios, the remaining active groups may be scaled as described without exceeding their caps.

A computer system is also disclosed in which unused system resources are initially allocated among groups that may become active or inactive. The system reallocates unused resources among active groups by scaling up these groups' initial entitlement shares, subject to maximum caps that may apply. For each group, the computer system calculates a scaling ratio equal to the cap divided by the entitlement, and then sorts the groups according their scaling ratios. The system processes each group in increasing order of their scaling ratios and reaches a maximal share of system resources to be allotted to each group, where the maximal share for an active group is between, or equal to, the group's initial entitlement value and its cap. Inactive groups have maximal shares equal to zero, reflecting that they receive no system resources. As the system processes the groups, it attempts to simply scale each active group by its scaling ratio. If scaling all unprocessed groups by the current group's scaling ratio would exceed the unallocated resources, then the remaining groups are scaled by the remaining resources divided by the sum of the entitlements of the remaining groups. Because the groups are sorted in order of increasing scaling ratios, the remaining active groups may be scaled as described without exceeding their caps.

DETAILED DESCRIPTION

The system creates a software method for reallocating unused system resources, also called the excess entitlement, by detecting inactive groups and reapportioning those groups' entitlement shares, $E(i)$, more efficiently. The method may operate on any system having limited resources allocated among various users or groups wherein each group is capped at a maximum limit, C(i), expressed as a percentage of the system resource. System resources may include any resource that is limited and allocated among groups, including, but not limited to, memory resources, CPU resources, bandwidth resources, etc. Groups refer to any process or set of processes that consumes or uses system resources and to which system resources have been allocated. Groups may include particular software applications running on the system, portions of applications running as separate groups of processes, or any other consumer of system resources. The method may be implemented on any system that allocates these resources among various users or groups.

By way of illustration only and not by way of limitation, the method sometimes is illustrated using a computer system's memory as a specified resource that is allocated and using software applications as examples of groups of resource consumers. In some illustrations, reference is made particularly to the Hewlett-Packard Unix System (HP-UX) on which system resources may be allocated, for example, by using the Workload Manager program available from the Hewlett-Packard Company, described more fully at http://www.hp.com/go/wlm or http://www.hp.com to allocate system resources. In this regard, the HP-UX system refers to system resources in terms of "shares" as single percent units of the resources. That is, one share equals 1% of a system resource, and herein the term share may be used to represent an allocation of a system resource relative to sum total of said resource, although one skilled in the art will recognize that the method is not limited in the HP-UX system or to any system that uses "shares."

Figure 1A:
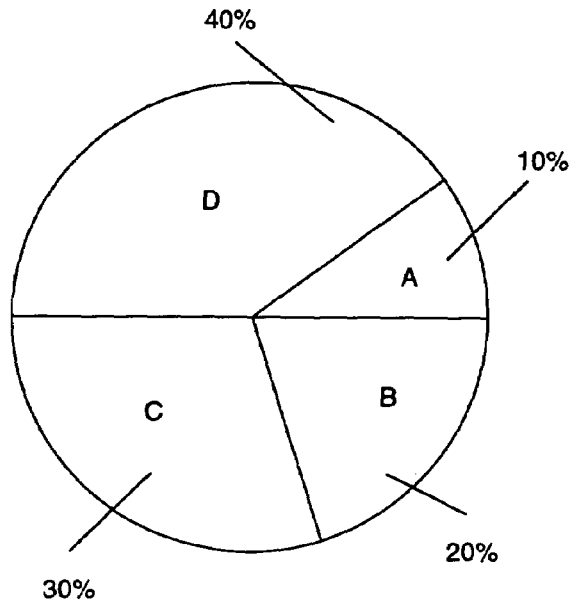
FIG. 1A shows a pie chart of entitlements of system resources.

FIG. 1a shows one example of entitlements of a system resource in a system having four groups. When a group becomes inactive, that group's entitlement would be wasted unless it is reallocated. The sum of entitlements of the inactive groups is referred to herein as the excess entitlement. In the example of FIG. 1a, if Group D became inactive, the system would only use 60% of its available memory. Group D's 40% excess entitlement would be wasted if Group D is not enabled and Group D's entitlement is not reallocated among the other, active groups. Group D's absence frees up 40% of the system's memory, which can be used by other programs while Group D is inactive. It is therefore desirable to reallocate the excess entitlement to allow other groups to use the system resource. If groups have caps, or maximum limits, it is also desirable to prevent these groups from exceeding their caps.

Figure 1B:
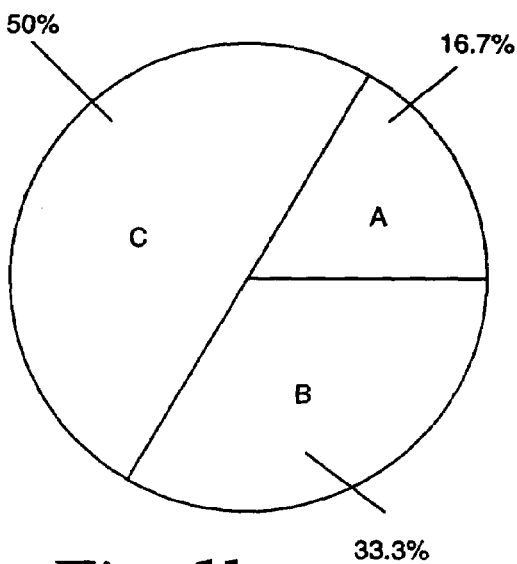
FIG. 1B shows a pie chart of new allocations of system resources using a scaling method of redistribution.

One way to reallocate the excess entitlements of inactive groups might be to simply scale each of the active groups by their respective entitlements. Under this method referred to as "scaling," the excess entitlement is reallocated to the remaining active groups, proportionately to their respective shares of system resources. FIG. 1b shows a pie chart of one example of reallocation of excess entitlement using a simple scaling method. For example, in the illustration shown above Group D is inactive and the excess entitlement is 40%. This 40% share could be scaled and reallocated to the remaining groups by the factor of 1/(0.6), yielding respective shares of system resources allocated as follows:

| Group A | 16.7% |
|---------|-------|
| Group B | 33.3% |
| Group C | 50%   |

Each active group's allocation of system resources is equal to its entitlement plus some reallocation amount of the excess entitlement. The sum value of system resources allocated to each group after redistributing the excess entitlement is referred to as the maximal value, M(i). It is desirable that the maximal values be calculated in a fair and efficient manner.

In addition, the user or the system may externally impose caps on the amount of resources that may be allocated to particular groups. Simply scaling excess entitlements is not the most efficient way of reallocating unused resources because particular groups may have caps, or maximum limits, of system resources that should be made available to the groups, C(i). The user may set maximum limits on the amount of system resources that should be provided to some or all of the groups to ensure an efficient allocation.

For example, in the illustration above, Group A may be capped at 15%; yet when scaled in the simple scaling scenario shown, it would receive 16.7% of the system resource. It might not be appropriate to exceed the externally-imposed cap by 1.7%, for example if A cannot use the excess and if it could be used by the other groups. This illustrates one problem with scaling, because simply scaling the excess entitlement would give one group—Group A—more resources than were permitted by the cap. A better solution would not allow groups to exceed their caps.

Figure 1C:
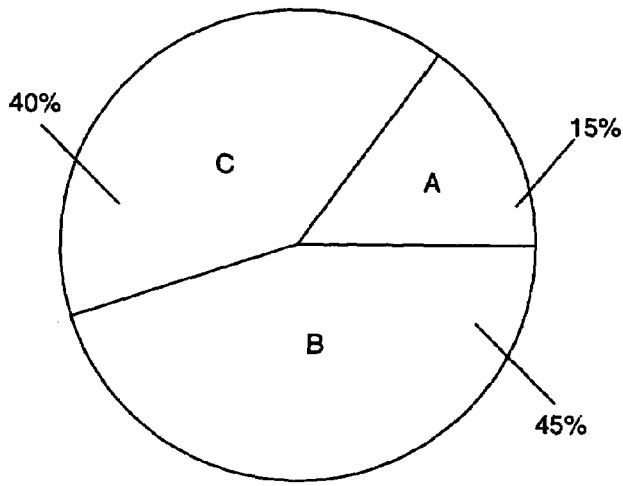
FIG. 1C shows a pie chart of new allocations of system resources using a filling method of redistribution.

One simple solution to deal with maximum limits of resource allocations to particular groups would be to simply full up the groups in a particular order up to their caps until the entire excess entitlement is reallocated. This method may be referred to as "filling." FIG. 1c shows a pie chart of one example of reallocating the excess entitlement using a simple filling method. In the example above, if Group A is limited to a cap of 15% of system resources, Group B is limited to a cap of 45% of system resources, and Group C is limited to a cap of 60% of system resources, this filling redistribution of D's unused resources when going in progressive order from A through C would be as follows:

| Group A | 15% |
|---------|-----|
| Group B | 45% |
| Group C | 40% |

The filling method ensures that no excess system resources are distributed to groups in excess of their respective caps.

One problem with simply filling excess resources up to the caps in a progressive or other order is that excess allocations are fundamentally unfair because they are based arbitrarily on the order in which applications might be listed in a system. A user of such a system might expect an allocation that is different than that produced when each group is simply filled progressively up to its cap. For example, in the illustration shown above, the user had predefined Group C as being allocated a greater entitlement than Group B. Yet, when using the filling method, Group B is allocated 45% of system resources because that is its cap, while Group C remains at its 40% entitlement. Group B receives 50% more system resources than its entitlement, yet Group C receives none of the excess entitlement simply because Group B might be listed first on a filling list. A better solution would allocate excess resources in a less arbitrary manner.

Another means of reallocating unused resources, referred to as the "scaling and clipping" method, is to first scale the excess resources among the active groups and then reallocate any amounts above a particular group's class to another designated group. For example, in the illustration above, if Group A is allocated 16.7% of the system resources and A has a cap of 15%, then 1.7% of A's resources could be reallocated either to Group B or C, whichever is designated. Groups B and C would retain their original scaled allocations of 33.3% and 50% respectively, plus any additional amounts from Group A as designated. In order to make the scaling and clipping method efficient, the method might simply place the excess 1.7% from Group A into either Group B or C, whichever is set as a default for receiving excess. The scaling and clipping method provides a more fair distribution of excess resources, but it is not ideal because the designated group simply takes over any excess, and that excess is not distributed among the other active groups. In other examples, the excess after scaling could be significantly larger than 1.7%, producing the same problem seen in a filling method.

The scaling and clipping method may be refined using an iterated scaling and clipping method to produce better results. Instead of assigning the excess resources to a single default group, the scaling process could be repeated giving the excess resources only to groups that have not yet reached their maximum caps. Each subsequent round of scaling and clipping acts only on the groups that have not yet reached their respective maximum caps. The algorithm achieves an optimal share distribution, but it is not computationally efficient. The iterated method requires execution time given by $O(N^2)$ in the worst case where N is the number of groups. This is because each scaling/clipping round is an $O(N)$ operation, and the system could possibly have to execute through N rounds. In practice, the number of groups may be substantially larger than the four shown in these simple illustrations, and the computational time could be significant. A more computationally efficient method of achieving this same distribution is desirable.

Figures 2, 3:
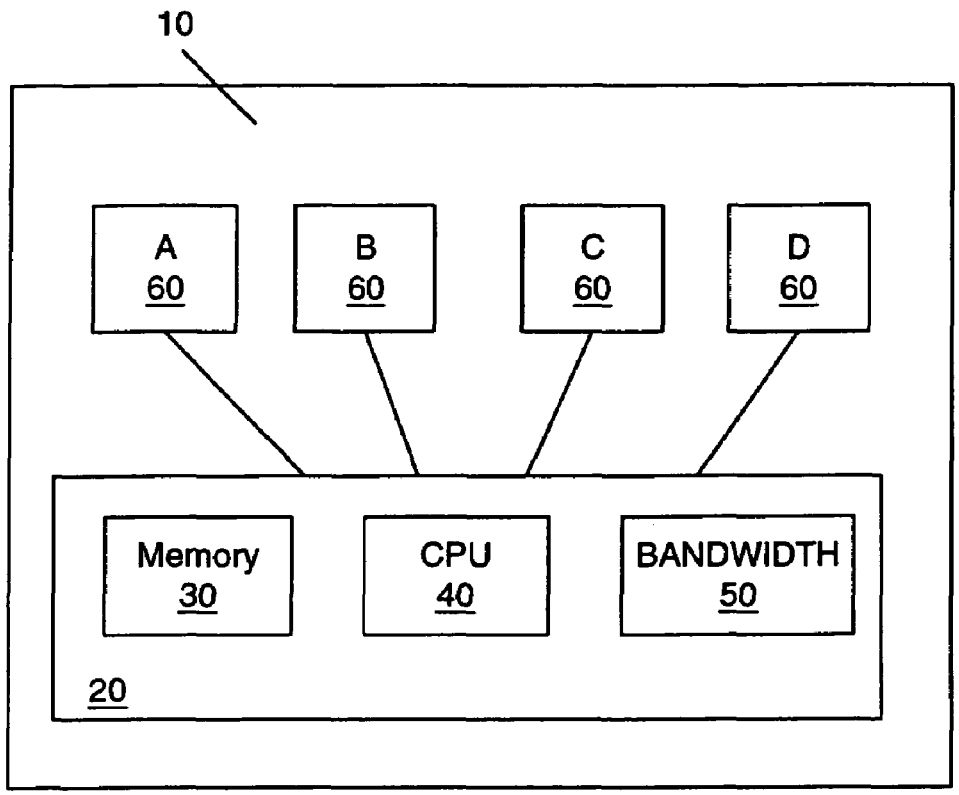
FIG. 2 shows a system having groups that access system resources.
FIG. 3 shows a chart of the list of groups sorted by scaling ratios.

FIG. 2 shows a block diagram of a computer system 10 having system resources 20. These system resources 20 may include memory resources 30, CPU resources 40, bandwidth resources 50, and any other resources used by applications running on the system. The system also has groups 60, or applications 60, running on the system 10, each of which may be active or inactive at any given moment. Each of these groups 60 accesses system resources 20 when operating, and each group 60 is allocated an entitlement, $E(i)$, of system resources 20, such that when all groups 60 are active, each group 60 has access to the system resources 20 according to its entitlement, $E(i)$. That is, if Group A is entitled to 10% ($E(A)=10\%$) of a system resource 20, such as memory 60, then Group A will have access to 10% of the memory when all groups 60 are active, and possibly will have access to more memory 30 when some groups 60 are inactive and the excess entitlement is redistributed. A group's entitlement, $E(i)$, and maximum limit, $C(i)$, may vary with respect to each particular resource 20. For example, Group A may have an entitlement of 10% with respect to memory resources 30, but might have an entitlement of 20% with respect to bandwidth resources 50.

Let any group in the system 10 be designated by i, where the system 10 has N groups. For each group, the method uses two predetermined values—the entitlement $E(i)$ and the maximum limit, or cap value, $C(i)$. For each i, $E(i)$ is less than or equal to $C(i)$, because the entitlement for each group should not ordinarily exceed the cap. Also, the sum of all entitlements, $E(i)$, should equal 100% because all of the system resources are allocated in terms of $E(i)$ for each group where $E(i)$ is expressed as a percentage of the system resources. The user or the system directly or indirectly configures $E(i)$ and $C(i)$ by setting an entitlement value and a maximum cap value for each group.

For each group i, the system 10 creates an optimal allocation of system resources referred to as the maximal allocation, which is expressed as $M(i)$. $M(i)$ will be chosen such that $E(i)$ is less than or equal to $M(i)$, and $M(i)$ is less than or equal to $C(i)$. That is, the maximal value is between, or equal to one of, the entitlement and the maximum cap. The system 10 calculates a maximum scaling ratio r for each group 60 equal to the group's maximum limit divided by its entitlement, $r(i)=C(i)/E(i)$. After initialization of the $r(i)$ =values, the system sorts the list of groups such that their values are in increasing order. Once the list has been sorted, the algorithm of the system can be applied repeatedly to the list without resorting because the information influencing the order does not change unless the system is reconfigured.

The system 10 also identifies the set of i values whose groups 60 are disabled, which set is expressed as I. For these i values, $M(i)$ will be zero. For all other i values, the maximal set of $M(i)$ values are chosen such that there is a scaling ratio, s, such that for all groups i, the maximal allocation divided by the entitlement, $M(i)/E(i)$, is less than or equal to the scaling ratio, s. If the value of the maximal allocation divided by the entitlement, $M(i)/E(i)$, would be less than the scaling ratio, s, then the maximal allocation, $M(i)$, is set equal to the group's cap, $C(i)$. In other words, the total resources distributed to each active group will be scaled up from the group's entitlement by a fixed ratio, or will be set to the group's cap, whichever is less.

Figure 4:
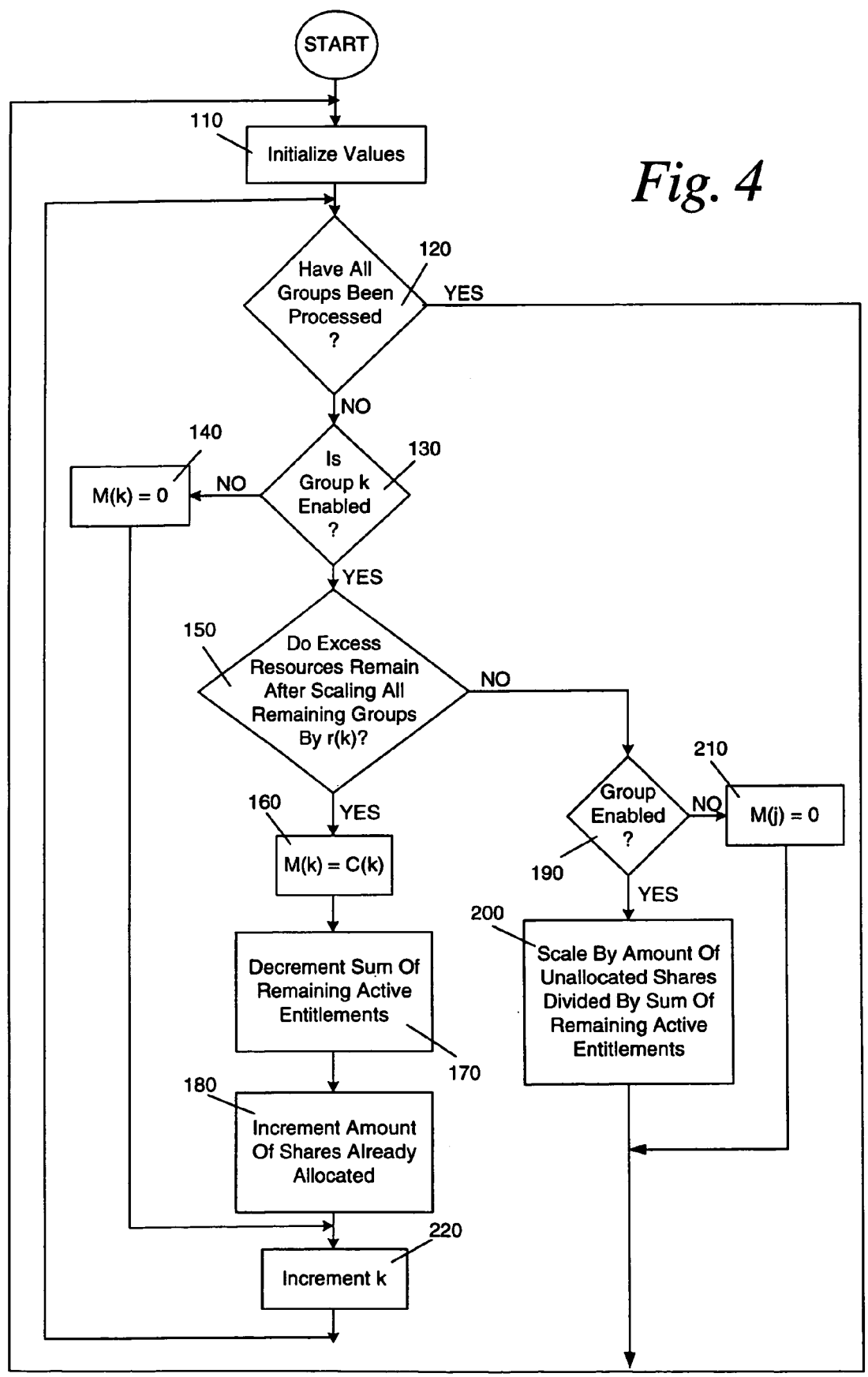
FIG. 4 shows a flow chart of the method of the system.

FIG. 4 shows a flow chart of the method used to allocate system resources 20. The same algorithm is set forth in pseudo-code herein, and reference is made to both the flow chart and the pseudo-code. First, the method initializes certain values 110. In one embodiment, the particular groups, i, in their sorted order, are represented by the letter k, where k is a number between 1 and N, where N is the total number of groups. The system initially sets k equal to 1, whereby the first group to be processed by the system is Group No. 1 as sorted in the order on increasing $r(k)$ values.

The system also keeps track of the sum of all shares actually used by active groups or already reallocated to active groups from the excess entitlement through the method used by the system. In the example of FIG. 4 and the pseudocode shown herein, the variable P represents the shares to be scaled. Initially, P is set equal to the sum of the entitlements for all active groups, $E(i)$, because at the start of the reallocation method none of the excess entitlement has been reallocated yet.

The system also keeps track of the amount of the resource that has already been allocated by the method, as illustrated by the letter Q in the pseudocode. Initially, Q is set to zero because no entitlement has been allocated when the method begins. The system also tracks the total number of shares available to allocate among all groups. In the illustration, the letter T represents the total number of shares available and is initially set at 100, representing that 100% of the system's particular resource is available.

After initializing 110 the values, the method then determines whether all groups have been processed 120. If all of the groups have been processed, then the method is completed for this particular reallocation and may be restarted again as needed. In one embodiment, the method may be repeated periodically to determine whether active groups have become inactive or vice-versa so that reallocations may be made as needed.

If all of the groups have not been processed, such as at the start of the reallocation method, then the method determines whether or not the particular instant group, k, has been enabled 130. If the instant group is not enabled or active, then its maximal value, M(k) is set to zero, and the method proceeds to the next group by incrementing the group number, k, 230 and then determining again whether all groups have been processed 120.

If the instant group, k, is enabled, then the method attempts to scale by the instant group's scaling ratio, r(k), by determining 150 whether excess resources would remain after scaling the remaining groups by this same scaling factor, r(k) 150. If excess resources remain, then group k's maximal value, M(k), is set 160 equal to the maximum limit, C(k), because the group has reached its cap.

The sum of the active entitlements, illustrated as P in the example, is then decreased 170 by the entitlement for group k, E(k), to reflect that this entitlement has been processed already. The number of remaining shares or percentage of the resource already allocated, Q, is incremented 180 by the group's cap C(k), to reflect that this amount of the excess entitlement has already been allocated. The system then proceeds to the next group by incrementing k 220 and again determining whether all groups have been processed 120.

If the remaining groups, j, cannot be scaled by r(k) without exceeding the remaining resources, then all of the remaining groups are scaled by a fixed ratio s(k). This is done by determining whether each subsequent group, k, in the sorted list is enabled 190. For the groups that are not enabled, their maximal values, M(j), are set to zero 210, reflecting that they do not require any system resources. The groups that are enabled are scaled 200 by the amount of unallocated shares, T−Q, divided by the sum of the remaining active entitlements, P. After setting the maximal allocation values for the remaining groups, the method is complete because all active groups have been scaled. The process may be repeated as desired by beginning at the start and initializing values again 110, as noted above.

```
The process of FIG. 4 is illustrated by the following pseudo code:
let k = 1                                    /* 110 */
let P = (sum of E(i) for all active groups)  /* 110 */
let Q = 0       /* shares already allocated 110 */
let T = 100     /* shares available to allocate 110 */
while k <= N    /* 120 */
{
  if (group k is not enabled) /* 130 */
  {
    M(k) = 0 /* 140 */
  }
  else
  {
    if r(k) * P + Q < T   /* do we run out if we scale by r(k)?
                             150 */
    {
      M(k) = C(k)     /* 160 */
      P -= E(k)       /* 170 */
      Q += C(k)       /* 180 */
    }
    else
    {
      for j = k to N /* scale remaining groups by same amount */
      {
        if (group j is enabled) /* 190 */
        {
          M(j) = E(j) * (T - Q) / P   /* 200 */
        }
        else
        {
          M(j) = 0 /* 210 */
        }
      }
      break  /* done */
    }
  }
  k++ /* 220 */
}
```

If the system processes all groups and raises each to its cap, C(k), without being able to scale by any group's scaling ratio, r(k), then excess system resources may remain after the process. In this case, one embodiment of the system may simply allow the excess resources to go unallocated. Another embodiment allocates these excess resources to a default group, to a plurality of default groups, to groups in a list order, to all of the active groups evenly, or to an inactive group or groups.

An advantage of the system is that it reallocates unused system resources among active groups in an efficient manner. The system avoids allocating excess resources to groups beyond their maximum limits. The system also avoids allocating excess resources arbitrarily, but instead attempts to allocate excess resources according to groups' entitlements and maximum limits.

Another advantage of the system is that it allocates excess resources more quickly than other methods. The system runs in O(N) time because it must only traverse the list of groups once, performing a finite set of operations at each group. This is made possible by pre-sorting the groups based on their scaling ratios. In contrast, a system using a scaling and clipping method that repeats to reallocate excess shares for every group that reaches its maximum limit would be given by the substantially slower function, $O(N^2)$.

Although the present invention has been described with respect to particular embodiments thereof, variations are possible. The present invention may be embodied in specific forms without departing from the essential spirit or attributes there of. In particular, the invention has been illustrated using memory, CPU, and bandwidth as examples of system resources and software applications as examples of groups. The system has also been illustrated with respect to certain Hewlett-Packard systems that measure system resources in terms of shares as percent units of the entire system resource. One skilled in the art will recognize that the present invention may be applied to any system in which resources are initially allocated among groups that may not be active, and/or in which unused resources are to be reallocated among active users in an efficient manner. It is desired that the embodiments described herein be considered in all respects illustrative and not restrictive and that reference be made to the appended claims for determining the scope of the invention.

We claim:

1. A method for allocating system resources among groups having entitlement values and maximum limits comprising:
    allocating a computer system resource to active groups according to respective entitlement values;
    determining an excess entitlement allocated to inactive groups;
    calculating a scaling ratio for each group;
    sorting active groups by their scaling ratios, creating a list of active groups in an increasing order;

calculating an optimal distribution of the excess entitlement values to be reallocated to each active group by traversing exactly one time the list of active groups in the increasing order; and reallocating the excess entitlement values to the active groups according to the optimal distribution for each active group, wherein optimal values reallocated to the active groups are in proportion to the respective entitlement values, and wherein a total resource reallocated to each of the active groups does not exceed a maximum limit for each of the active groups.

2. The method of claim 1, wherein the maximal values for inactive groups is set equal to zero.

3. The method of claim 1, wherein the scaling ratio is a ratio between the maximum limit and the entitlement value.

4. The method of claim 1, wherein the step of reallocating comprises:
determining whether unprocessed groups can scale by the scaling ratio of a current group without exhausting unallocated resources; and
if the unprocessed groups can scale without exhausting the unallocated resources, then setting the maximal value of the current group equal to the maximum limit of the current group.

5. The method of claim 4, wherein the step of reallocating further comprises:
if the unprocessed groups cannot scale without exhausting the unallocated resources, then scaling the unprocessed groups by the unallocated resources.

6. The method of claim 1, further comprising processing the groups individually as sorted by the scaling ratio, whereby the groups having a higher maximum limit relative to their entitlement values are processed after groups having a lower maximum limit relative to their entitlement values.

7. A computer system for allocating system resources among groups having entitlement values and maximum limits comprising:
a memory; and
a software program stored in the memory, which software program
allocates a system resource to active groups according to respective entitlement values;
determines an excess entitlement allocated to inactive groups;
calculates a scaling ratio for each group;
sorts active groups by their scaling ratios, creating a list of active groups in an increasing order;
calculates an optimal distribution of the excess entitlement values to be reallocated to each active group by traversing exactly one time the list of active groups in the increasing order; and
reallocates the excess entitlement values to the active groups according to the optimal distribution for each active group, wherein optimal values reallocated to the active groups are in proportion to the respective entitlement values, and wherein a total resource reallocated to each of the active groups does not exceed a maximum limit for each of the active groups.

8. The computer system of claim 7, wherein the scaling ratio is a ratio between the maximum limit and the entitlement value.

9. The computer system of claim 7, wherein the step of reallocating comprises: determining whether unprocessed groups can scale by the scaling ration of a current group without exhausting unallocated resources; and if the unprocessed groups can scale without exhausting the unallocated resources, then setting the maximum value of the current group equal to the maximum limit of the current group.

10. The method of claim 9, wherein the step of reallocating further comprises:
if the unprocessed groups cannot scale without exhausting the unallocated resources, then scaling the unprocessed groups by the unallocated resources.

11. The computer system of claim 10, wherein the software program processes the groups individually as sorted by the scaling ratios, whereby the groups having a higher maximum limit relative to their entitlement values are processed after groups having a lower maximum limit relative to their entitlement values.

12. The computer system of claim 11, wherein the step of reallocating further comprises, if a portion of the excess entitlement remains unallocated after processing all active groups, reallocating the portion to one or more active or inactive groups.

13. A software system comprising:
a tangible storage medium; and
a software program stored in the medium, which software program
allocates a system resource to active groups according to respective entitlement values;
determines an excess entitlement allocated to inactive groups;
calculates a scaling ratio for each group;
sorts active groups by their scaling ratios, creating a list of active groups in an increasing order;
calculates an optimal distribution of the excess entitlement values to be reallocated to each active group by traversing exactly one time the list of active groups in the increasing order; and
reallocating the excess entitlement values to the active groups according to the optimal distribution for each active group, wherein optimal values reallocated to the active groups are in proportion to active groups' respective entitlement values, and wherein a total resource reallocated to each of the active groups does not exceed a maximum limit for the groups.

14. The computer system of claim 13, wherein the scaling ration is a ratio between the maximum limit and the entitlement value.

15. The computer system of claim 13, wherein the step of reallocating comprises:
determining whether unprocessed groups can scale by the scaling ratio of a current group without exhausting unallocated resources; and if the unprocessed groups can scale without exhausting the unallocated resources, then setting the maximum value of the current group equal to the maximum limit of the current group.

16. The method of claim 15, wherein the step of reallocating further comprises:
if the unprocessed groups cannot scale without exhausting the unallocated resources, then scaling the unprocessed groups by the unallocated resources.

17. The computer system of claim 16, wherein the software program processes the groups individually as sorted by the scaling ratios, whereby the groups having a higher maximum limit relative to their entitlement values are processed after groups having a lower maximum limit relative to their entitlement values.

* * * * *

UNITED STATES PATENT AND TRADEMARK OFFICE
CERTIFICATE OF CORRECTION

PATENT NO. : 7,225,223 B1 Page 1 of 1
APPLICATION NO. : 09/665934
DATED : May 29, 2007
INVENTOR(S) : Clifford A. McCarthy et al.

It is certified that error appears in the above-identified patent and that said Letters Patent is hereby corrected as shown below:

On the title page, item (75), "Inventors", in column 1, line 1, delete "Dallas, TX" and insert -- Richardson, TX --, therefor.

In column 4, line 29, delete "full" and insert -- fill --, therefor.

In column 6, line 14, delete "=" before "values".

In column 9, line 31, in Claim 6, delete "ratio" and insert -- ratios --, therefor.

In column 9, line 65, in Claim 9, delete "ration" and insert -- ratio --, therefor.

In column 10, line 2, in Claim 9, delete "maximum" and insert -- maximal --, therefor.

In column 10, line 44, in Claim 14, delete "ration" and insert -- ratio --, therefor.

In column 10, line 52, in Claim 15, delete "maximum" and insert -- maximal --, therefor.

Signed and Sealed this

Second Day of September, 2008

JON W. DUDAS
*Director of the United States Patent and Trademark Office*